United States Patent [19]

Thach et al.

[11] Patent Number: 4,701,271
[45] Date of Patent: Oct. 20, 1987

[54] TREATING OIL-WATER-SURFACTANT EMULSIONS WITH STRONG INORGANIC ACID

[75] Inventors: Sophany Thach; Stephen J. Salter, both of Dallas; Kevin O. Meyers; Ronald M. Giordano, both of Plano, all of Tex.

[73] Assignee: Atlantic Richfield Company, Los Angeles, Calif.

[21] Appl. No.: 415,089

[22] Filed: Sep. 7, 1982

[51] Int. Cl.$^4$ .......................... C09K 7/00; B01J 13/00
[52] U.S. Cl. ............................. 252/8.554; 252/8.515; 252/312; 252/330; 252/344; 166/266; 166/267; 166/274
[58] Field of Search ............... 252/8.55 D, 8.5 P, 312, 252/330, 341, 344, 8.554, 8.515; 166/266, 267, 273, 274, 305 R

[56] References Cited

U.S. PATENT DOCUMENTS

| | | | |
|---|---|---|---|
| 3,107,726 | 10/1963 | Greenwald | 166/266 |
| 3,108,059 | 10/1963 | Greenwald | 252/330 |
| 4,058,453 | 11/1977 | Patel et al. | 252/329 X |
| 4,147,638 | 4/1979 | Plummer | 252/8.55 D X |
| 4,177,207 | 12/1979 | Nussbaum et al. | 252/8.55 D X |
| 4,374,734 | 2/1983 | Newcombe | 252/344 X |

OTHER PUBLICATIONS

Kirk-Othmer, Encyclopedia of Chemical Technology, Third Edition, vol. 22, pp. 349-353, (1983).

Primary Examiner—John F. Terapane
Assistant Examiner—Catherine S. Kilby
Attorney, Agent, or Firm—M. David Folzenlogen; Michael E. Martin

[57] ABSTRACT

When sulfonated surfactants are used to displace crude oil from a subterranean formation, the produced oil and water contain the surfactant and form a tight emulsion. This crude oil-water-surfactant emulsion is broken with a strong inorganic acid, for example, hydrochloric acid. The amount of acid added is sufficient to lower the pH of the water in the emulsion to 3.0 or lower. Thereafter, the oil is separated from the emulsion by conventional techniques.

3 Claims, No Drawings

TREATING OIL-WATER-SURFACTANT EMULSIONS WITH STRONG INORGANIC ACID

This invention pertains to breaking crude oil-water-sulfonated surfactant emulsions produced in oil producing operations wherein a liquid containing a sulfonated surfactant has been used to displace oil from a subterranean formation. More particular, an emulsion formed of produced water and crude oil that contains a surfactant is treated with a strong inorganic acid.

Displacement of crude oil from subterranean formations with a liquid, including a mixture of liquids, containing a petroleum sulfonated surfactant has undergone intensive study and field testing in recent years. These enhanced oil recovery techniques use a variety of liquid solutions or mixtures at least one of which contains the sulfonated surfactant. The liquids vary from water and surfactant by itself to mixtures of oil, water, alcohol, viscosity increasing agents, antiabsorbent or sacrificial materials, and other additives in one or more stages.

The displacing liquid containing the sulfonated surfactant is injected as an oil displacing fluid into a permeable, oil bearing formation at a pressure sufficient to displace recoverable oil contained within the interstices of the formation. Injection operations are normally continued until some of the produced liquids contain the sulfonated surfactant. In the production equipment, the sulfonated surfactant molecules promote the formation of a stable crude oil-water emulsion. A stable emulsion is an emulsion that will not break down without some form of treating.

An emulsion is a combination of two immiscible liquids or liquids that do not mix together under normal conditions. One of the liquids is spread out or dispersed throughout the other in the form of droplets. These dispersed droplets may be of any size. Either the crude oil or the water may be the dispersed phase depending on the characteristics of the emulsifying agents and the relative quantities of oil and water produced. Sometimes a dual emulsion occurs, that is, an emulsion is dispersed in one of the other phases.

A stable emulsion of crude oil and water must be treated, that is, the water must be removed from the oil before the crude oil can be delivered to a pipeline. Treating is generally done in the field using various types of equipment. Emulsions have been broken by heat and by electric current. Most crude oil-water producing facilities have emulsion treating equipment. The tendency is to install equipment with the least possible initial investment. Under certain conditions, emulsion breaking chemicals must be added to an emulsion to cause it to break. Any chemical system for breaking crude oil-water sulfonated surfactant emulsions should, therefore, be readily applicable to existing equipment.

In chemical treatment systems, the emulsion breaking chemicals may be added to the emulsion at any point in the production system before or at the point where the oil is to be recovered from the emulsion depending upon the amount of capital outlay required, the nature of the treating equipment, and the need to conserve light ends produced with the crude oil. In an emulsion, there are two forces in direct opposition. One force is the film of the emulsifying agent that holds the droplets. This force tends to prevent the droplets from merging together to form larger drops. The other force is opposite to the tendency of water droplets to join together to form larger drops which would normally yield to the force of gravity and settle out. Therefore, to break down a crude oil-water emulsion, the properties of the emulsifying agent must be neutralized or destroyed so that the droplets of water may unite. Many procedures for neutralizing and destroying the emulsifying agent have been developed. In chemical treatment one theory suggests that the chemical be used to strictly neutralize the emulsifying agent. In other words, to break a water and crude oil emulsion another emulsifying agent should be added that would normally produce a reverse emulsion. Another theory suggests that the chemical makes the film of emulsifying agent very rigid. Thus, when the enclosed water is expanded by heating the film is torn and the water droplets can merge and the emulsion is broken.

In one oil producing area using a liquid mixture containing sulfonated surfactant, for several months a stable crude oil-in-water emulsion was formed which required chemical treatment. Without treatment, seventy-five percent of the produced crude oil was not separable from the produced water. The best treatment devised by emulsion treating companies toward improving this situation did little to improve the amount of oil ultimately recovered. The process merely reduced the time for separation. This separation process was so slow that inefficient, open-air, settling pits were required. Moreover, normal fluctuations in concentration of the displacement chemicals in the produced fluids affected the recommended emulsion treating process and necessitated re-investigation and revision of the chemical treating process.

The process of this invention for breaking an oil-water emulsion containing a sulfonated surfactant was conceived and developed. In the laboratory, this process caused almost instantaneous oil-water separation and left less than 100 parts per million of oil in the water. The degree of oil separation and the rapidity of separation was a vast improvement over processes previously used and the process of this invention does not require the use of open-air pits.

In the practice of this invention, a strong inorganic acid is added to an emulsion comprised of crude oil, water and sulfonated surfactant produced from a subterranean formation into which a liquid containing sulfonated surfactant was injected to displace oil from the formation. The minimum amount of acid added is sufficient to lower the pH of the water in the emulsion to a level at which the emulsion breaks; that is, a pH of B 3 and lower. Oil is then separated from the treated emulsion. In a preferred embodiment, the amount of acid added is at least 40 parts per million based on the total weight of water in the emulsion treated.

While not wishing to be bound by any specific theoretical explanation for achieving the benefits of this emulsion breaking process, it is believed that the inorganic acid favors the formation of sulfonic acids which are much less water soluble than the original surfactant. The loss of water solubility greatly alters the oil-water solubility balance of the surfactant. This reduces the ability of the sulfonated surfactant to cause oil-water emulsions. This consequently results in an effective separation of oil from the emulsion.

The chemicals used in this emulsion treating process are readily used in conventional existing oil-water separators and may be added at any suitable point in producing systems using conventional pumps, lubricators, drips or other chemical supplying systems. For example, the demulsifiers may be used downhole, in flowlines, in separation equipment and the like. Flowline treatment is preferred. Although continuous treatment is preferred, the batch method may be used. Sometimes the way the chemical is added is dependent on temperature or oil-water separation time. The crude oil and water may be separated and the oil recovered with any conventional separating equipment, such as, for example, a gun barrel or wash tank, a settling tank, a free water knockout, a vertical or horizontal separator, a skim pit and the like.

The following specific example serves to illustrate the advantages of the present invention, but is not be considered limiting. When 2500 p.p.m. of hydrochloric acid was added to an oil-water-sulfonated surfactant emulsion, the amount of oil emulsified in water containing a sulfonate surfactant was reduced from 6.5% by volume originally to less than 100 p.p.m. almost instantaneously. Conventional demulsifiers took several days to bring the amount of oil emulsified in water to less than 0.5%. Over 90% of the acid was consumed by the buffering electrolytes such as bicarbonates and only a very small portion of the acid was directly involved in lowering the pH to the desired level. The amount of acid required, therefore, to break the emulsion is expected to be considerably less when the amount of buffering electrolytes is small.

The advantages of this process are further illustrated in Table I showing the results obtained by the addition of conventional demulsifiers and hydrochloric acid to a sample of produced fluids containing 6.5% oil by volume and 800 p.p.m. of petroleum sulfonate. The samples were agitated with 100 shakes and allowed to stand quiescent for up to 72 hours at 100° F.

TABLE I

| Demulsifiying Agent | Amount of Oil and Grease Remaining in Brine, p.p.m. | | | | | Visual Observation | | |
| --- | --- | --- | --- | --- | --- | --- | --- | --- |
| | 4 Hrs. | 12 Hrs. | 24 Hrs. | 48 Hrs. | 72 Hrs. | Brine | Interface | Oil |
| None | — | — | — | — | — | Cloudy | Poor | Cloudy |
| Conventional 50 ppm | 13,500 | 11,000 | 7,600 | 4,800 | 4,400 | Cloudy | Sharp | Clear |
| HCl: 2500 ppm pH ~ 3 | 500 | 54 | ~0 | ~0 | ~0 | Clear | Very Sharp | Clear |

We claim:

1. In the recovery of oil from a subterranean formation by injecting into said formation a liquid containing a sulfonated surfactant, a method for breaking an emulsion comprising adding a strong inorganic acid to an emulsion comprised of crude oil, water and sulfonated surfactant produced from said formation, the amount of said acid added to said emulsion being in an amount sufficient to cause the pH of the water in said emulsion to be 3.0 or lower than 3.0.

2. In the method of claim 1 wherein the amount of acid added is sufficient to provide at least 40 p.p.m. of the acid in the water in the emulsion.

3. In the method of claims 1 or 2 wherein the strong inorganic acid is hydrochloric acid.

* * * * *